United States Patent
Fukami et al.

(10) Patent No.: US 11,092,058 B1
(45) Date of Patent: Aug. 17, 2021

(54) INTERNAL COMBUSTION ENGINE CONTROL METHOD AND INTERNAL COMBUSTION ENGINE CONTROL DEVICE

(71) Applicant: Nissan Motor Co., Ltd., Yokohama (JP)

(72) Inventors: Toru Fukami, Kanagawa (JP); Kentaro Kawahara, Kanagawa (JP); Yoshifumi Iribe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/968,195

(22) PCT Filed: Mar. 19, 2018

(86) PCT No.: PCT/JP2018/010892
§ 371 (c)(1),
(2) Date: Aug. 7, 2020

(87) PCT Pub. No.: WO2019/180793
PCT Pub. Date: Sep. 26, 2019

(51) Int. Cl.
| | | |
|---|---|---|
| *F01N 9/00* | (2006.01) | |
| *F02D 41/02* | (2006.01) | |
| *F01N 3/023* | (2006.01) | |
| *F01P 3/20* | (2006.01) | |
| *F01N 5/02* | (2006.01) | |

(52) U.S. Cl.
CPC .......... *F01N 9/002* (2013.01); *F02D 41/029* (2013.01); *F01N 3/023* (2013.01); *F01N 5/02* (2013.01);
(Continued)

(58) Field of Classification Search
CPC ........ F01N 9/002; F01N 2240/20; F01N 5/02; F01N 3/023; F01N 2560/08;
(Continued)

(56) References Cited

U.S. PATENT DOCUMENTS 10,054,026 B2   8/2018 Murata et al.
10,066,561 B2 *  9/2018 Marlett ................... F02D 41/26
(Continued)

FOREIGN PATENT DOCUMENTS

JP    S57-210115 A    12/1982
JP    2008-274885 A   11/2008
(Continued)

*Primary Examiner* — Matthew T Largi
(74) *Attorney, Agent, or Firm* — Global IP Counselors, LLP

(57) ABSTRACT

An internal combustion engine control method controls an internal combustion engine equipped with an exhaust gas temperature variation factor unit that varies the temperature of an exhaust gas of the internal combustion engine, an exhaust heat recovery device disposed in an exhaust passage downstream of the exhaust gas temperature variation factor unit and that recovers the heat from the exhaust gas into a refrigerant that cools the internal combustion engine, and a refrigerant flow rate adjustment unit that adjusts a flow rate of the refrigerant that passes through the exhaust heat recovery device. The internal combustion engine control method estimates a boiling margin, which is a parameter related to a thermal margin when the refrigerant boils in the exhaust heat recovery device, and determines whether to execute a boiling avoidance process in accordance with the boiling margin.

6 Claims, 6 Drawing Sheets

(52) U.S. Cl.
CPC ...... *F01N 2240/02* (2013.01); *F01N 2240/20* (2013.01); *F01N 2560/06* (2013.01); *F01N 2560/08* (2013.01); *F01P 3/20* (2013.01); *F01P 2060/16* (2013.01)

(58) Field of Classification Search
CPC ............. F01N 2240/02; F01N 2560/06; F02D 41/029; F01P 2060/16; F01P 3/20
See application file for complete search history.

(56) References Cited

U.S. PATENT DOCUMENTS

| | | | | |
|---|---|---|---|---|
| 10,119,484 | B2* | 11/2018 | Park | F02B 29/0443 |
| 2010/0043403 | A1* | 2/2010 | Minamikawa | B01D 46/0061 |
| | | | | 60/285 |
| 2012/0102918 | A1* | 5/2012 | Smith | F01N 13/082 |
| | | | | 60/273 |
| 2013/0037235 | A1* | 2/2013 | Sakabe | F28D 15/0266 |
| | | | | 165/41 |
| 2016/0341100 | A1* | 11/2016 | Nagai | F01P 7/16 |
| 2016/0376970 | A1* | 12/2016 | Murata | F01N 5/02 |
| | | | | 60/320 |
| 2017/0218865 | A1* | 8/2017 | Styles | F02D 41/0052 |
| 2018/0171940 | A1* | 6/2018 | Gonz Lez | F28F 27/02 |

FOREIGN PATENT DOCUMENTS

| | | |
|---|---|---|
| JP | 2013-249794 A | 12/2013 |
| JP | 2017-8868 A | 1/2017 |
| WO | 2013/180283 A1 | 12/2013 |
| WO | 2015/125260 A1 | 8/2015 |

* cited by examiner

INTERNAL COMBUSTION ENGINE CONTROL METHOD AND INTERNAL COMBUSTION ENGINE CONTROL DEVICE

CROSS-REFERENCE TO RELATED APPLICATIONS

This application is a U.S. national stage application of International Application No. PCT/JP2018/010892, filed on Mar. 19, 2018.

BACKGROUND

Technical Field

The present invention relates to control of an internal combustion engine.

Background Information

An exhaust gas recovery system that recovers the heat from exhaust gas (hereinafter also referred to as exhaust heat) into a refrigerant for cooling the engine for the purpose of improving performance of a vehicle heater and increasing the temperature of cooling water at an early stage at the time of starting a cooler is known. As a specific configuration, a configuration in which an exhaust heat recovery device is provided in an exhaust passage of an engine, and heat exchange is carried out between the exhaust gas and the refrigerant in this exhaust heat recovery device, is known.

When the exhaust heat recovery system described above is provided, it becomes necessary to prevent the refrigerant from boiling in the exhaust heat recovery device. As a control therefor, JP2008-274885A discloses estimating the refrigerant flow rate that is necessary for preventing the refrigerant from boiling in the exhaust heat recovery device, and controlling the refrigerant flow rate based on the estimation.

SUMMARY

In recent years, a configuration in which a filter that collects particulate matter included in exhaust gas is provided in the exhaust passage of the engine is known. With respect to diesel engines, a so-called DPF (Diesel Particulate Filter) is known, and DPFs are already installed in many vehicles for regulatory compliance in various countries. On the other hand, installing filters in gasoline engines in order to reduce the emission of particulate matter is also being considered. A filter for gasoline engines is called a GPF (Gasoline Particulate Filter). In addition, when it is not necessary to distinguish between the DPF and the GPF, the term filter or PF (Particulate Filter) will be used.

Since PFs have a limited capacity for collecting fine particles, when the collected amount reaches a prescribed level, it is necessary to perform a so-called regeneration, in which the collected particulate matter is burned and removed. When the regeneration is carried out, the exhaust gas is heated in the PF by the combustion heat. As a result, in a configuration in which the exhaust gas flows into the exhaust heat recovery device after passing the PF, when regeneration is carried out, the amount of recovered heat in the exhaust heat recovery device increases; thus, the refrigerant easily boils in the exhaust heat recovery device.

However, the above-described document does not assume a configuration in which the PF is provided in the exhaust passage. Thus, in the control disclosed in the above-described document, there is the risk that the refrigerant will boil when regeneration is performed.

Therefore, an object of the present invention is to prevent the boiling of the refrigerant in the exhaust heat recovery device, even if the PF is provided in the exhaust passage of the engine.

According to one aspect of the present invention, an internal combustion engine control method for controlling an internal combustion engine equipped with an exhaust gas temperature variation factor unit that causes the temperature of the exhaust gas of the internal combustion engine to vary, an exhaust heat recovery device that is disposed in an exhaust passage downstream of the exhaust gas temperature variation factor unit in the flow direction of the exhaust gas and that recovers the heat from the exhaust gas into a refrigerant that cools the internal combustion engine, and a refrigerant flow rate adjustment unit that adjusts flow rate of the refrigerant that passes through the exhaust heat recovery device is provided. The internal combustion engine control method comprises estimating a boiling margin, which is a parameter related to the thermal margin when the refrigerant boils in the exhaust heat recovery device, and determining whether to execute a boiling avoidance process in accordance with the boiling margin.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below with reference to the drawings, etc.

First Embodiment

Figure 1:
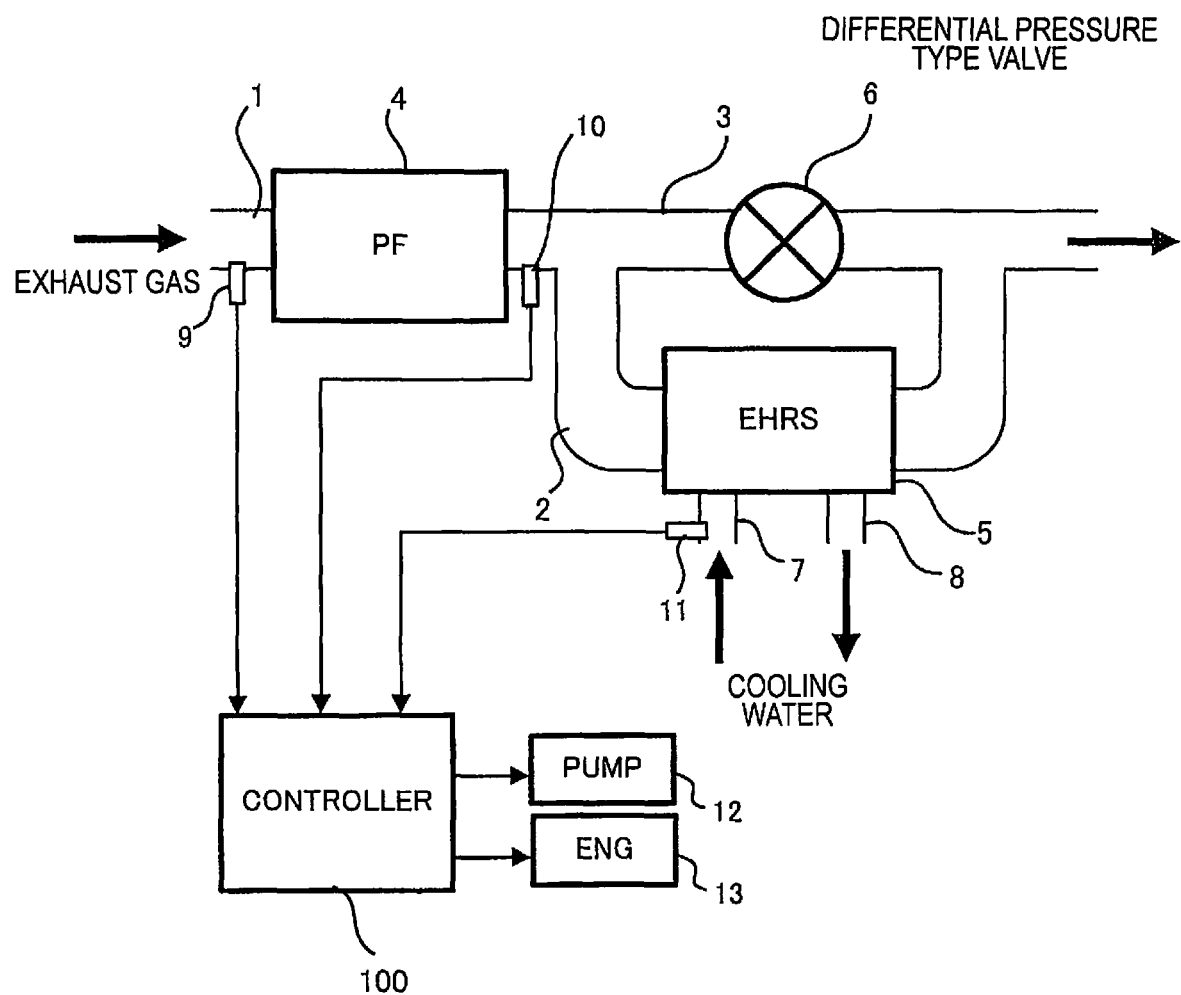
FIG. 1 is a schematic view of a system to which a first embodiment is applied.

FIG. 1 is a schematic diagram of a system to which the first embodiment is applied. A filter 4 is disposed in an exhaust passage 1. The exhaust passage 1 branches, downstream of the filter 4, into a main passage 2 provided with an exhaust heat recovery device 5 serving as an exhaust gas temperature variation factor unit, and a bypass passage 3, which bypasses the exhaust heat recovery device 5. A differential pressure type valve 6 is disposed in the bypass passage 3.

The filter 4 has a function of collecting particulate matter included in exhaust gas. Specifically, it is a GPF when an internal combustion engine 13 is a gasoline engine, and a DPF in the case of a diesel engine.

A first pressure sensor 9 is disposed on the upstream side of the filter 4 of the exhaust passage 1, and a second pressure sensor 10 is disposed on the downstream side thereof. Detected values of the first pressure sensor 9 and the second pressure sensor 10 are read by a controller 100 serving as a control unit.

The exhaust heat recovery device 5 includes an exhaust gas flow path through which the exhaust gas passes, and a refrigerant flow path through which the refrigerant passes, and is configured to be capable of exchanging heat between the refrigerant and the exhaust gas. In the present embodiment, cooling water for cooling the internal combustion engine is used as the refrigerant. The refrigerant is supplied to the refrigerant flow path from a refrigerant inlet 7, and the refrigerant that has passed through the refrigerant flow path is discharged from a refrigerant outlet 8. The refrigerant inlet 7 is provided with a temperature sensor 11 for detecting the temperature of the refrigerant that flows into the exhaust heat recovery device 5. The detected value of the temperature sensor 11 is read by the controller 100.

The differential pressure type valve 6 is configured to open and close in accordance with the pressure difference between the upstream side and the downstream side. Specifically, the valve opens when the differential pressure, a value obtained by subtracting the downstream-side pressure of the differential pressure type valve 6 from the upstream-side pressure of the differential pressure type valve 6, exceeds a preset threshold value. Also, the opening degree of the differential pressure type valve 6 increases with differential pressure.

In addition to the detected values of the above-described sensors 9, 10, 11, the controller 100 reads the detected values of a crank angle sensor, an accelerator opening degree sensor, and the like, which are not shown, and controls the ignition and fuel injection of the internal combustion engine 13, and controls a refrigerant pump 12, etc. In addition, the controller 100 carries out so-called regeneration control, in which particulate matter is burned and removed when the amount of particulate matter deposited inside the filter 4 exceeds a preset threshold value. For example, if the internal combustion engine 13 is a diesel engine, the fuel injection amount is increased; if the internal combustion engine is a gasoline engine, the engine rotation speed is increased.

Moreover, the pressure loss of the exhaust gas that passes through increases as the amount of particulate matter deposited inside the filter 4 increases. Since the exhaust gas flow rate on the downstream side of the filter 4 decreases as the pressure loss increases, the opening degree of the differential pressure type valve 6 decreases. As a result, of the exhaust gas that passes through the filter 4, the proportion of the exhaust gas that flows into the exhaust heat recovery device 5 increases, and the amount of recovered heat by the exhaust heat recovery device 5 increases. Then, the temperature of the refrigerant that passes through the exhaust heat recovery device 5 increases as the amount of recovered heat increases.

On the other hand, when a regeneration control of the filter 4 is carried out, the temperature of the exhaust gas increases as a result of the combustion of the particulate matter.

Accordingly, when the regeneration control of the filter 4 is carried out in a state in which the temperature of the refrigerant has increased as described above, there is the risk that the refrigerant will boil in the exhaust heat recovery device 5.

Therefore, in order to prevent the boiling of the refrigerant, the controller 100 executes the control described below.

In the present embodiment, the controller 100 uses a boiling margin, which is a parameter relating to the thermal margin when the refrigerant boils in the exhaust heat recovery device 5, in order to determine whether to execute a boiling avoidance process for preventing the refrigerant from boiling. The boiling avoidance process will be described further below.

Figure 2:
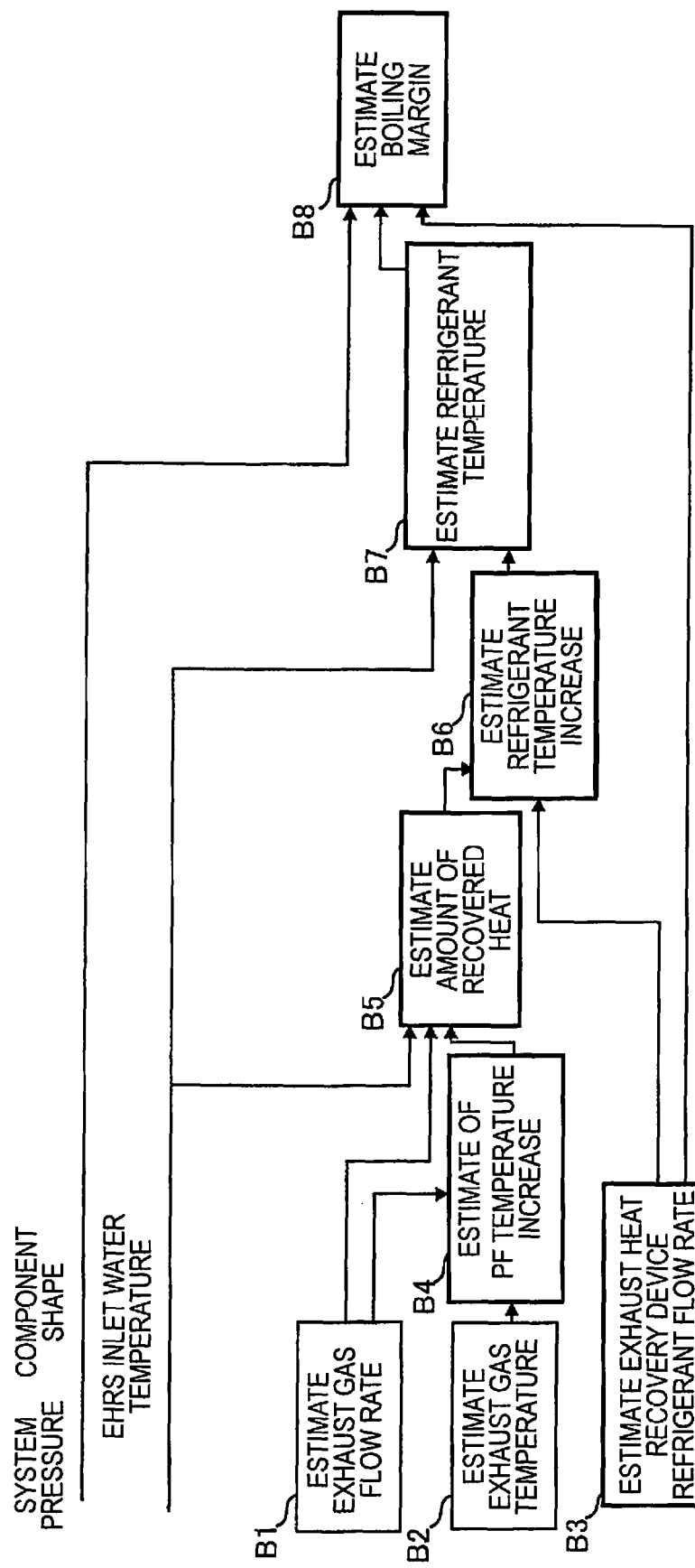
FIG. 2 is a block diagram illustrating a method for calculating a boiling margin.

FIG. 2 is a block diagram illustrating a method for calculating the boiling margin.

An exhaust gas flow rate estimation unit B1 estimates the flow rate of the exhaust gas that is discharged from the internal combustion engine 13. Specifically, a map is formed that shows the relationship between the engine rotation speed, the accelerator opening degree, and the exhaust gas flow rate and stored in the controller 100, and estimations are carried out by searching the map. A flow rate sensor may be provided in the exhaust passage 1 in order to detect the flow rate with the flow rate sensor.

An exhaust gas temperature estimation unit B2 estimates the temperature of the exhaust gas that is discharged from the internal combustion engine 13. Specifically, a map is formed that shows the relationship between the engine rotation speed, the accelerator opening degree, and the exhaust gas temperature and stored in the controller 100, and estimations are carried out by searching the map. A temperature sensor may be provided in the exhaust passage 1 in order to detect the temperature with the temperature sensor.

An exhaust heat recovery device refrigerant flow rate estimation unit B3 estimates the flow rate of the refrigerant that flows into the exhaust heat recovery device 5. Specifically, a map is formed that shows the relationship between the engine rotation speed, the accelerator opening degree, and the refrigerant flow rate and stored in the controller 100, and estimations are carried out by searching the map. A flow rate sensor may be provided at the inlet of the exhaust heat recovery device 5 in order to detect the flow rate with the flow rate sensor.

A filter temperature increase estimation unit B4 estimates the temperature increase of the exhaust gas in the filter 4 when regeneration is carried out. Specifically, the amount of deposited particulate is estimated based on the pressure difference between the upstream and downstream sides of the filter 4, and the temperature increase is estimated based on the amount of heat when the deposited particulate matter is burned, the exhaust gas flow rate, and the exhaust gas temperature.

An amount of recovered heat estimation unit B5 estimates the amount of recovered heat in the exhaust heat recovery device 5 using the following equation, based on the exhaust gas flow rate, the exhaust gas temperature, and the refrigerant temperature at the inlet of the exhaust heat recovery device 5 detected by the temperature sensor 11.

$$\text{Amount of recovered heat} = \text{specific heat} \times \text{exhaust gas flow rate} \times (\text{exhaust gas temperature} - \text{refrigerant temperature}) \times \text{heat recovery efficiency} \quad (1)$$

Figure 3:
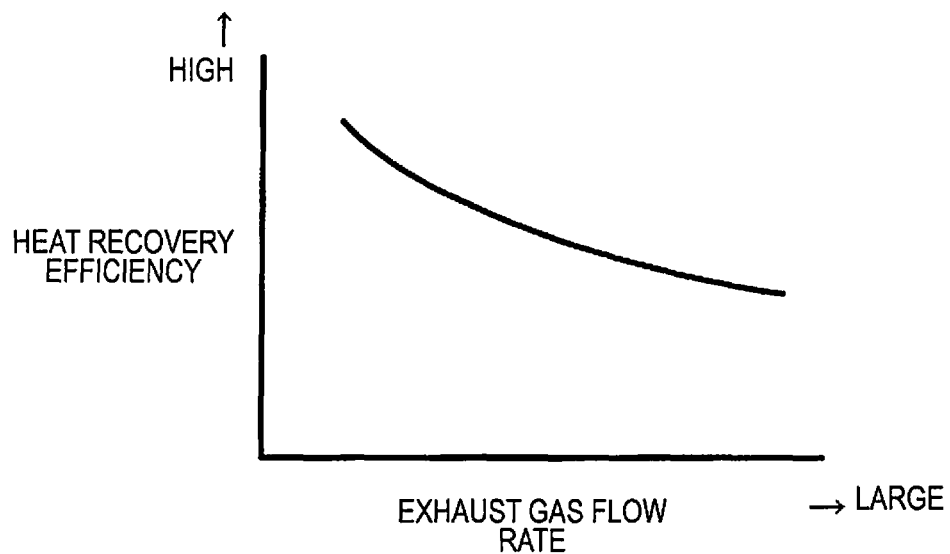
FIG. 3 is one example of a table showing the relationship between heat recovery efficiency and exhaust gas flow rate.

The exhaust gas flow rate in equation (1) is the exhaust gas flow rate that flows into the exhaust heat recovery device 5 calculated based on the exhaust gas flow rate estimated by the exhaust gas flow rate estimation unit B1. The detailed calculation method will be described further below. The "specific heat" in equation (1) is the specific heat of the exhaust gas, and a theoretical value is used. The exhaust gas temperature in equation (1) is the exhaust gas temperature that has increased by the amount of temperature increase estimated by the filter temperature increase estimation unit B4. The heat recovery efficiency in equation (1) is set by storing a table showing the relationship between the heat recovery efficiency and the exhaust gas flow rate, such as that shown in FIG. 3, in the controller 100, and searching the table.

A refrigerant temperature increase estimation unit B6 estimates the temperature increase of the refrigerant in the exhaust heat recovery device 5 based on the amount of recovered heat and the flow rate of the refrigerant that flows into the exhaust heat recovery device 5.

A refrigerant temperature estimation unit B7 estimates the refrigerant temperature at the outlet of the exhaust heat recovery device 5 based on the refrigerant temperature at the inlet of the exhaust heat recovery device 5 and the temperature increase of the refrigerant in the exhaust heat recovery device 5.

Figure 4:
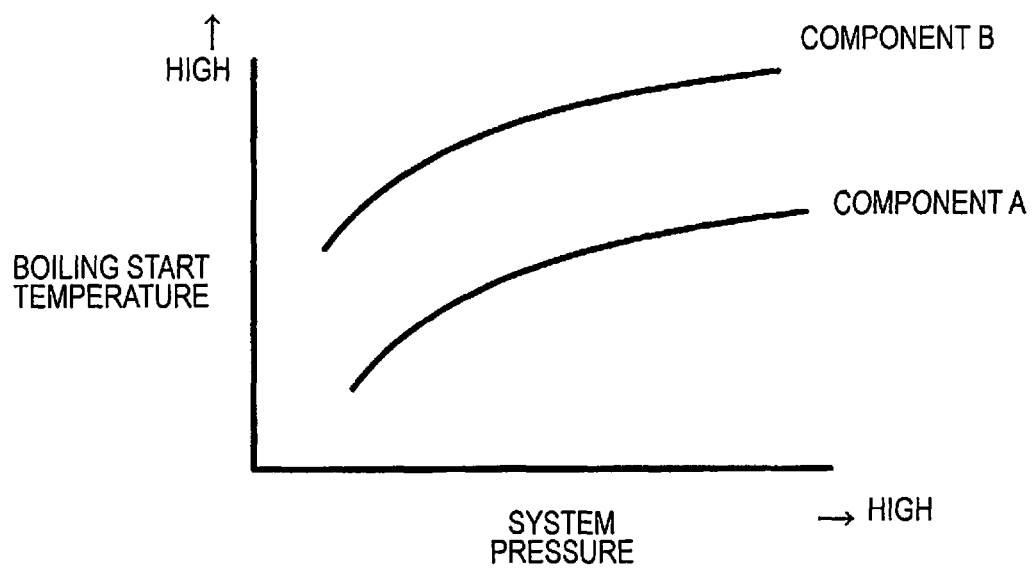
FIG. 4 is one example of a table showing boiling start temperature of refrigerant, system pressure, and component shape.

A boiling margin estimation unit B8 estimates the boiling margin based on the boiling start temperature estimated from the refrigerant temperature at the outlet of the exhaust heat recovery device 5, the system pressure, and the component shape. The boiling margin is the difference between the boiling start temperature and the refrigerant temperature at the outlet of the exhaust heat recovery device 5 estimated by the refrigerant temperature estimation unit B7. The system pressure is the pressure inside the refrigerant flow path and is detected by a sensor. The component shape is the interior and exterior shape of the exhaust heat recovery device 5. The boiling start temperature of the refrigerant, the system pressure, and the component shape have a correlation as shown in FIG. 4, for example. Component A and component B are components with different shapes. That is, there is the characteristic that the boiling start temperature increases with system pressure, and even if the system pressure stays the same, the boiling start temperature will differ if the component shape differs. Therefore, in the system to which the present embodiment is applied, how the boiling start temperature changes relative to changes in system pressure is investigated in advance and formed into a table, and the boiling start temperature is estimated by means of a table search.

As described above, since the filter temperature increase estimation unit B4 estimates the temperature increase of the exhaust gas in the filter 4, even if a component that causes variations in the exhaust gas temperature, such as the filter 4, is present upstream of the exhaust heat recovery device 5, the temperature of the refrigerant that flows into the exhaust heat recovery device 5 can be more accurately estimated.

A control for avoiding the boiling of the refrigerant will be described next.

Figure 5:
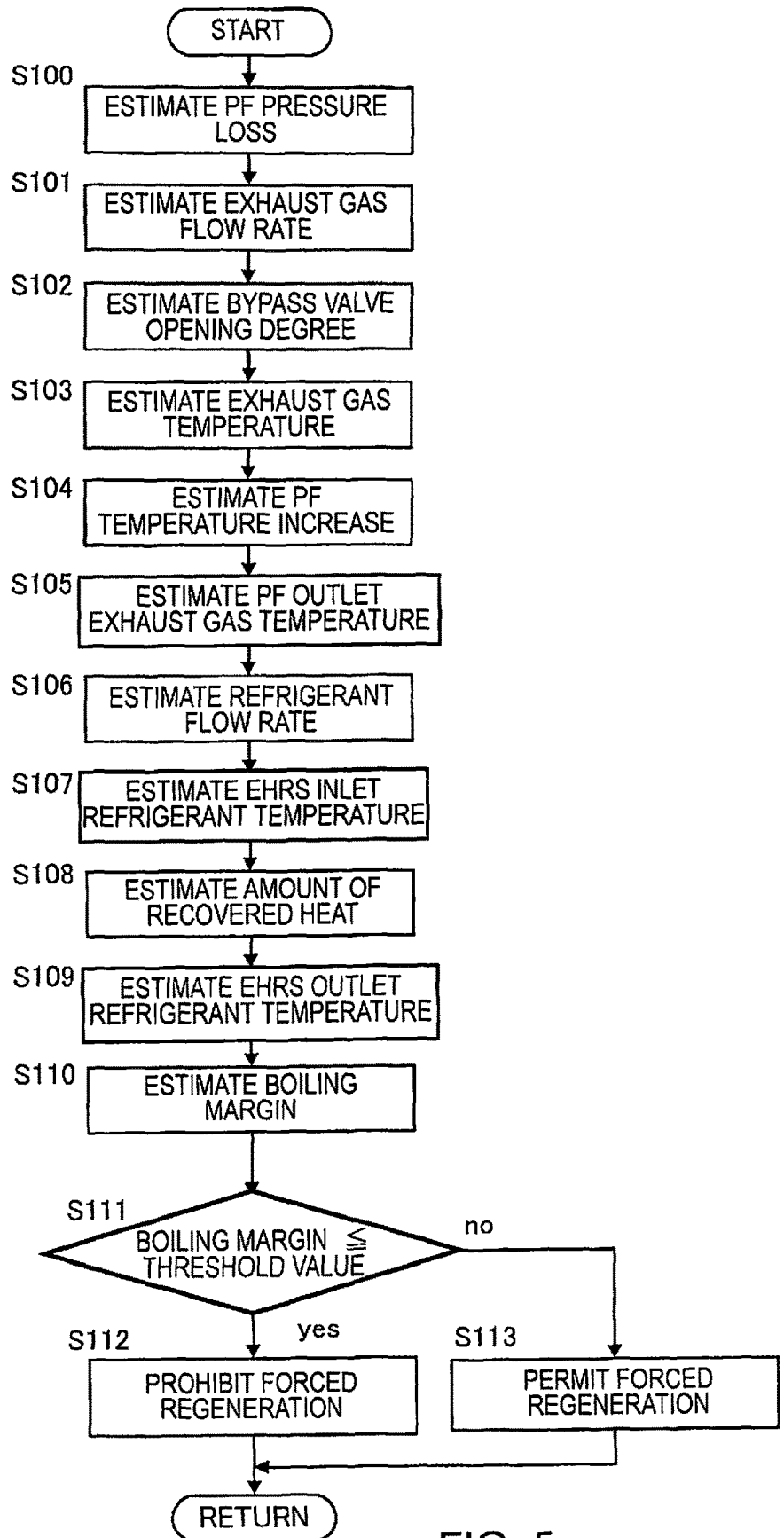
FIG. 5 is a flowchart illustrating a control routine according to the first embodiment.

FIG. 5 is a flowchart illustrating a control routine executed by the controller 100.

In Step S100, the controller 100 estimates the pressure loss in the filter 4. Specifically, the difference between the detected value of the first pressure sensor 9 and the detected value of the second pressure sensor 10 is calculated. The method for estimating the pressure loss is not limited to this one, and known methods may be used, such as an estimation method that uses the cumulative distance traveled.

In Step S101, the controller 100 estimates the flow rate of the exhaust gas that is discharged from the internal combustion engine 13, that is, the flow rate of the exhaust gas that flows into the filter 4. The specific estimation method is as stated in the description of the exhaust gas flow rate estimation unit B1.

In Step S102, the controller 100 estimates the opening degree of the differential pressure type valve 6. Specifically, first, the exhaust gas flow rate at the outlet of the filter 4 is estimated from the pressure loss of the filter 4 and the flow rate of the exhaust gas that flows into the filter 4. Then, the pressure of the exhaust passage 1 on the outlet side of the filter 4 is estimated from the exhaust gas flow rate at the outlet of the filter 4, and the opening degree of the differential pressure type valve 6 is estimated based on this estimated pressure value and the characteristics of the differential pressure type valve 6.

In Step S103, the controller 100 estimates the exhaust gas temperature at the outlet of the internal combustion engine 13. The specific estimation method is as stated in the description of the exhaust gas temperature estimation unit B2.

In Step S104, the controller 100 estimates the temperature increase of the exhaust gas in the filter 4 when regeneration is carried out. The specific estimation method is as stated in the description of the filter temperature increase estimation unit B4.

In Step S105, the controller 100 estimates the exhaust gas temperature at the outlet of the filter 4. Specifically, the temperature increase estimated in Step S104 is added to the exhaust gas temperature estimated in Step S103.

In Step S106, the controller 100 estimates the flow rate of the refrigerant that flows into the exhaust heat recovery device 5. The specific estimation method is as stated in the description of the exhaust heat recovery device refrigerant flow rate estimation unit B3.

In Step S107, the controller 100 estimates the refrigerant temperature at the inlet of the exhaust heat recovery device 5. Specifically, the detected value of the temperature sensor 11 is read.

In Step S108, the controller 100 estimates the amount of recovered heat in the exhaust heat recovery device 5 using the equation (1) above. The exhaust gas flow rate in the equation (1) will be described.

As described above, the exhaust gas flow rate in the equation (1) is the flow rate of the exhaust gas that flows into the exhaust heat recovery device 5, that is, the flow rate of the exhaust gas that flows through the main passage 2. The controller 100 estimates this exhaust gas flow rate based on the exhaust gas flow rate at the outlet of the filter 4 and the opening degree of the differential pressure type valve 6. Specifically, the relationship between the opening degree of the differential pressure type valve 6 and the ratio between the exhaust gas flow rate of the main passage 2 and the exhaust gas flow rate of the bypass passage 3 is checked in advance and stored in the controller 100, and the exhaust gas flow rate is estimated using the exhaust gas flow rate at the outlet of the filter 4 and the opening degree of the differential pressure type valve 6. Here, the exhaust gas flow rate at the outlet of the filter 4 is estimated based on the exhaust gas flow rate at the outlet of the internal combustion engine 13 and the pressure loss of the filter 4.

In Step S109, the controller 100 estimates the refrigerant temperature at the outlet of the exhaust heat recovery device 5 using the refrigerant temperature at the inlet of the exhaust heat recovery device 5 detected by the temperature sensor 11, the flow rate of the refrigerant that flows into the exhaust heat recovery device 5 estimated in Step S106, and the amount of recovered heat estimated in Step S108.

In Step S110, the controller 100 estimates the boiling margin. The specific estimation method is as stated in the description of the boiling margin estimation unit B8.

In Step S111, the controller 100 determines whether the boiling margin is less than or equal to a preset threshold value, executes the process of Step S112 if less than or equal to the threshold value, and executes the process of Step S113 if greater than the threshold value The process of Step S111 is for determining whether the refrigerant would boil if regeneration control were carried out. The boiling margin is the difference between the boiling start temperature of the refrigerant and the refrigerant temperature at the outlet of the exhaust heat recovery device 5 when the regeneration control is carried out. Thus, if the boiling margin were zero or less, the refrigerant would boil as a result of the regeneration control, but in consideration of sensor detection errors, estimation calculation errors, etc., a value greater than zero is set as the threshold value. The specific threshold value is determined on the basis of suitability.

In Step S112, the controller 100 prohibits the forced regeneration of the filter 4, which acts as the boiling avoidance process, and ends the current routine. Forced regeneration is regeneration control that is carried out by the controller 100 for the purpose of regenerating the filter 4. For example, increasing the quantity of injected fuel or reducing the intake air if the filter 4 is a DPF, and increasing the engine rotation speed if the filter 4 is a GPF. When the filter 4 is a GPF, forced regeneration does not include the particulate matter being burned as a result of increased engine rotation speed at the time of acceleration.

When forced regeneration is prohibited, the driver may be notified of the fact that a large amount of particulate matter is deposited on the filter 4 by illuminating a monitor lamp, or some other means.

In Step S113, the controller 100 permits forced regeneration and ends the current routine.

As described above, the controller 100 calculates the boiling margin based on the refrigerant temperature, the refrigerant flow rate, the exhaust gas flow rate, the exhaust gas temperature, the system pressure, and the opening degree of the differential pressure type valve 6. It is thus possible to estimate the boiling margin accurately. In particular, it is possible to estimate the boiling margin more accurately by estimating the flow rate of the exhaust gas that flows into the exhaust heat recovery device 5 based on the exhaust gas flow rate at the outlet of the filter 4 and the opening degree of the differential pressure type valve 6, and estimating the amount of recovered heat in the exhaust heat recovery device 5 based on the flow rate of the exhaust gas that flows into the exhaust heat recovery device 5.

As described above, in the present embodiment, the boiling margin, which is a parameter related to the thermal margin when the refrigerant boils in the exhaust heat recovery device 5, is estimated, and it is determined whether to execute a boiling avoidance process in accordance with the boiling margin. As a result, even if there is a component that causes variations in the exhaust gas temperature upstream of the exhaust heat recovery device 5, the temperature of the refrigerant that flows into the exhaust heat recovery device 5 can be estimated accurately, and it becomes possible to prevent the refrigerant from boiling by means of the boiling avoidance process.

In the present embodiment, the exhaust gas temperature variation factor unit is the filter 4, which collects the particulate matter included in the exhaust gas, and when the boiling margin is less than or equal to the threshold value, the forced regeneration of the filter 4 is prohibited, which acts as the boiling avoidance process. As a result, it becomes possible to determine accurately whether the refrigerant would boil if the regeneration control of the filter 4 were executed, and to prevent the refrigerant from boiling by prohibiting the forced regeneration if there is a boiling risk.

In the present embodiment, the temperature increase of the filter 4 due to the combustion of the particulate matter collected by the filter 4 is estimated based on pressure loss of the filter 4, and the filter outlet exhaust gas temperature, which is the temperature of the exhaust gas after passing through the filter 4, is estimated based on the temperature increase. Then, the amount of recovered heat is estimated based on the filter outlet exhaust gas temperature, the exhaust heat recovery device outlet refrigerant temperature, which is the temperature of the refrigerant after the refrigerant passes through the exhaust heat recovery device 5, is estimated based on the amount of recovered heat, and the boiling margin is estimated based on the difference between the exhaust heat recovery device outlet refrigerant temperature, and the boiling point of the refrigerant. It is thus possible to estimate the boiling margin accurately.

Second Embodiment

The second embodiment will be described. The difference from the first embodiment lies in the content of the boiling avoidance process. In the first embodiment, the prohibition of forced regeneration acts as the boiling avoidance process, but in the second embodiment, in addition to the prohibition of forced regeneration, an increased refrigerant flow rate is also used. Hereinafter, differences from the first embodiment will be mainly described.

Figure 6:
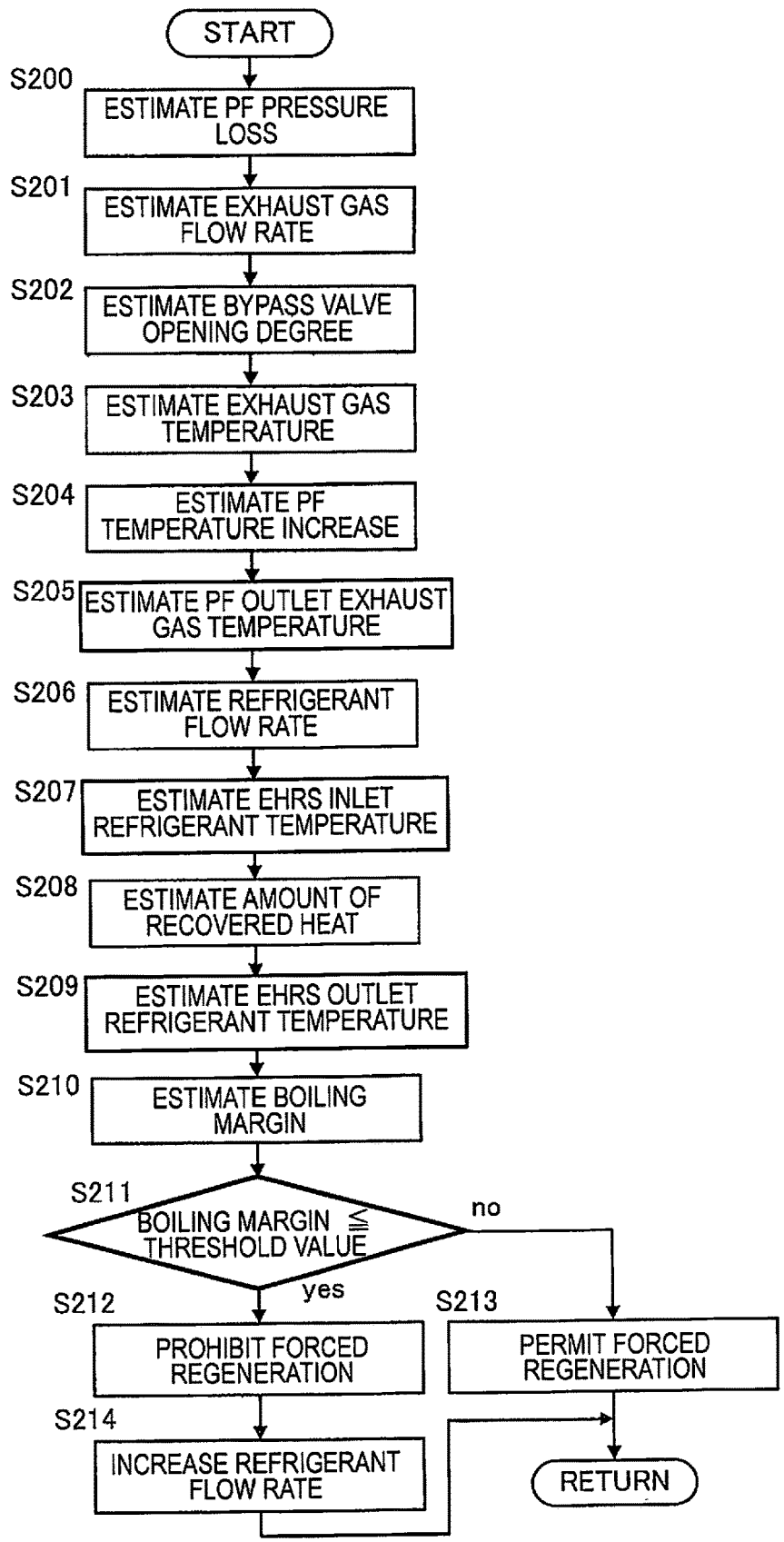
FIG. 6 is a flowchart illustrating a control routine according to a second embodiment.

FIG. 6 is a flowchart illustrating a control routine executed by the controller 100. Since Steps S200-S213 are the same as Steps S100-S113 of FIG. 5, their description will be omitted.

In Step S214, the controller 100 increases the refrigerant flow rate and ends the current routine. The amount of increase is set in advance on the basis of suitability, or the like. When the refrigerant flow rate is increased, the refrigerant temperature at the outlet of the exhaust heat recovery device 5 decreases even if the amount of recovered heat does not change, so that the boiling margin increases. Therefore, repetition of this routine increases the boiling margin above the threshold value and permits forced regeneration.

That is, in the present embodiment, when it is estimated that the refrigerant would boil if forced regeneration were carried out, the forced regeneration is prohibited, and the refrigerant flow rate is increased in order to increase the boiling margin. Then, when the boiling margin exceeds the threshold value, that is, when there is no longer a risk of the refrigerant boiling even if forced regeneration were carried out, the forced regeneration is permitted.

As described above, in the present embodiment, when the boiling margin is less than or equal to the threshold value, forced regeneration of the filter 4 is prohibited as the boiling avoidance process, the flow rate of the refrigerant is increased, and when the boiling margin exceeds the threshold value after the refrigerant flow rate is increased, the forced regeneration is permitted. It is thereby possible to carry out forced regeneration at a timing at which there is no risk of the refrigerant boiling.

Third Embodiment

The third embodiment will now be described. In the control described in the first and second embodiments, it is determined whether the refrigerant would boil before carrying out forced regeneration, and the forced regeneration is prohibited if there is a risk of boiling. In contrast, the control of the present embodiment is carried out if regeneration were to start at an unintended timing. A case in which regeneration starts at an unintended timing is, for example, a case in which the filter 4 is a GPF, and the engine rotation speed increases as a result of the driver depressing the accelerator pedal to accelerate, thereby starting regeneration.

Figure 7:
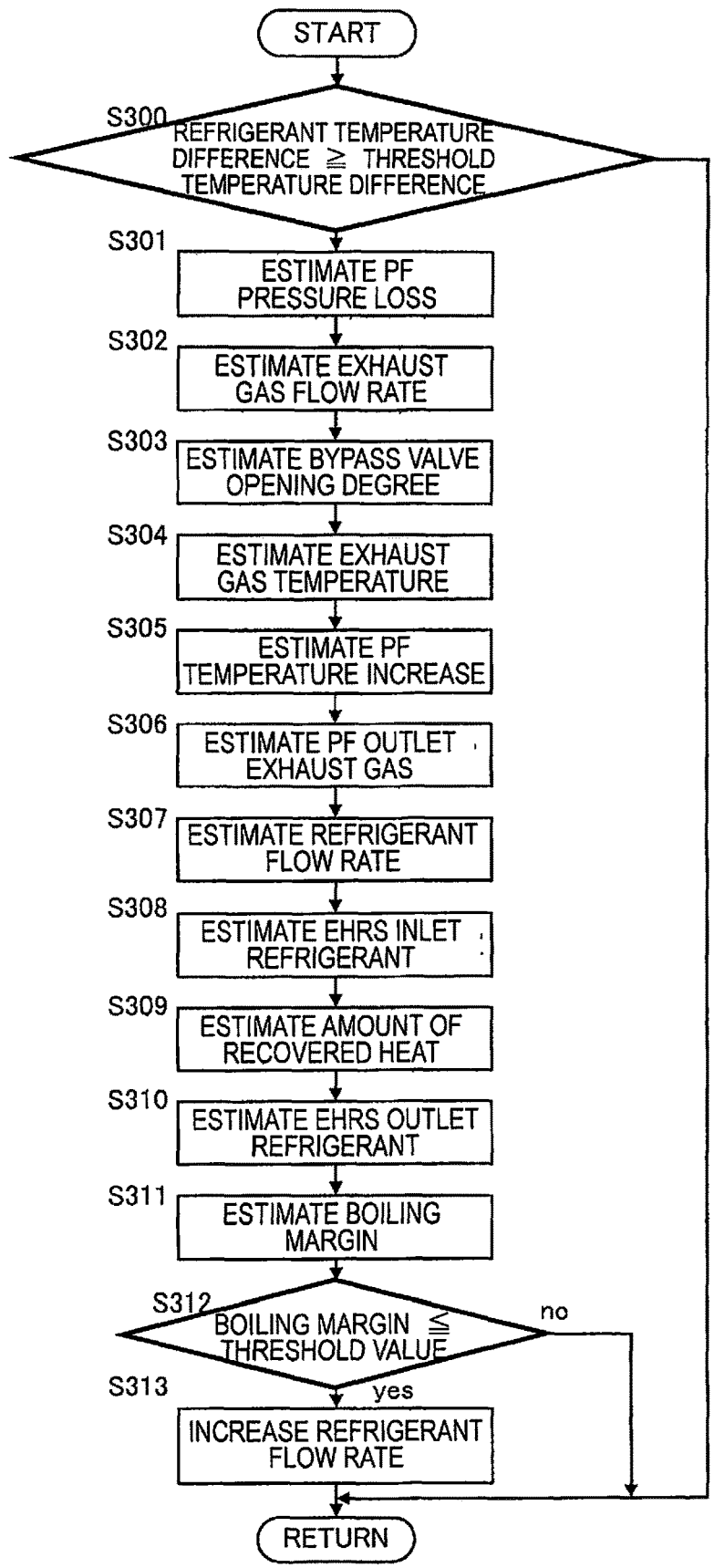
FIG. 7 is a flowchart illustrating a control routine according to a third embodiment.

FIG. 7 is a flowchart illustrating a control routine executed by the controller 100.

In Step S300, the controller 100 determines whether the difference between the refrigerant temperature at the inlet and the refrigerant temperature at the outlet of the exhaust heat recovery device 5 (hereinafter also referred to as refrigerant temperature difference) is greater than or equal to a threshold temperature difference. The refrigerant temperature at the inlet and the outlet of the exhaust heat recovery device 5 is respectively detected by a temperature sensor.

This determination is used to ascertain whether the regeneration of the filter 4 has started. Since the exhaust gas temperature increases when the regeneration of the filter 4 starts, the temperature of the refrigerant after undergoing heat exchange with the exhaust gas in the exhaust heat recovery device 5 also becomes higher compared to prior to the start of regeneration. Thus, it can be estimated that regeneration has started if the temperature difference between the refrigerant temperature at the outlet and at the inlet of the exhaust heat recovery device 5 increases suddenly. The threshold temperature difference used for the determination is set as deemed suitable in accordance with the specification of exhaust heat recovery device 5, and the like.

The controller 100 executes the process of Step S301 when it is determined that the refrigerant temperature difference is greater than or equal to the threshold temperature difference in Step S300, and ends the present routine when it is determined that the refrigerant temperature difference is smaller than the threshold temperature difference.

Since Steps S301-S312 are the same as Steps S100-S111 of FIG. 5, the description thereof will be omitted.

In Step S313, the controller 100 increases the refrigerant flow rate. That is, if the boiling margin is less than or equal to a threshold value even though the regeneration of the filter 4 has started, since the refrigerant would boil if left unchanged, the refrigerant flow rate is increased as the boiling avoidance process. It is thereby possible to prevent the refrigerant from boiling.

As described above, in the present embodiment, whether regeneration has started is estimated based on the difference between the inlet-side refrigerant temperature and the outlet-side refrigerant temperature of the filter 4, the boiling margin is estimated if regeneration has started, and the refrigerant flow rate is increased as the boiling avoidance process if the boiling margin is less than or equal to the threshold value. It is thus possible to prevent the refrigerant from boiling even if regeneration of the filter 4 has started at an unintended timing.

Each of the above-described embodiments may be combined as deemed appropriate. For example, the third embodiment may be combined with the first embodiment or the second embodiment.

Embodiments of the present invention were described above, but the above-described embodiments illustrate only some of the application examples of the present invention, and are not intended to limit the technical scope of the present invention to the specific configurations of the above-described embodiments.

The invention claimed is:

1. An internal combustion engine control method for controlling an internal combustion engine, equipped with
    an exhaust gas temperature variation factor unit that causes variations in a temperature of exhaust gas of the internal combustion engine,
    an exhaust heat recovery device that is disposed in an exhaust passage downstream of the exhaust gas temperature variation factor unit in a flow direction of the exhaust gas and that recovers heat from the exhaust gas into a refrigerant that cools the internal combustion engine, and
    a refrigerant flow rate adjustment unit that adjusts a flow rate of the refrigerant that passes through the exhaust heat recovery device,
    the exhaust gas temperature variation factor unit including a filter that collects particulate matter included in the exhaust gas,
    the internal combustion engine control method comprising:
    estimating a boiling margin, which is a parameter related to a thermal margin when the refrigerant boils in the exhaust heat recovery device, and
    prohibiting forced regeneration of the filter as a boiling avoidance process when the boiling margin is less than or equal to a threshold value.

2. The internal combustion engine control method according to claim 1, further comprising
    increasing the refrigerant flow rate when the boiling margin is less than or equal to the threshold value, and
    permitting the forced regeneration when the boiling margin exceeds the threshold value after the refrigerant flow rate is increased.

3. The internal combustion engine control method according to claim 1, further comprising
    estimating a temperature increase of the filter due to combustion of the particulate matter collected by the filter based on pressure loss of the filter,
    estimating a filter outlet exhaust gas temperature, which is a temperature of the exhaust gas after passing through the filter, based on the temperature increase of the filter,
    estimating an amount of recovered heat based on the filter outlet exhaust gas temperature, and
    estimating an exhaust heat recovery device outlet refrigerant temperature, which is a temperature of the refrigerant after the refrigerant has passed through the exhaust heat recovery device, based on the amount of recovered heat,
    the estimating of the boiling margin being based on a difference between the exhaust heat recovery device outlet refrigerant temperature and the boiling point of the refrigerant.

4. The internal combustion engine control method according to claim 3, wherein
    the internal combustion engine further comprises a bypass passage that bypasses the exhaust heat recovery device, and
    a bypass valve that is disposed in the bypass passage and that opens and closes in accordance with a pressure difference between an upstream side and a downstream side, and further comprising
    estimating a flow rate of the exhaust gas that flows into the exhaust heat recovery device based on an exhaust gas flow rate at a filter outlet and an opening degree of the bypass valve, and the estimating of the amount of recovered heat being based on the flow rate of the exhaust gas that flows into the exhaust heat recovery device.

5. The internal combustion engine control method according to claim 1, further comprising
determining whether the forced regeneration has started based on a difference between an inlet-side refrigerant temperature and an outlet-side refrigerant temperature of the filter, and
increasing the flow rate of the refrigerant as the boiling avoidance process when the boiling margin is estimated after the forced regeneration has started and when the boiling margin is less than or equal to the threshold value.

6. An internal combustion engine control device for controlling an internal combustion engine, the internal combustion engine control device comprising:
an exhaust gas temperature variation factor unit that causes variations in a temperature of an exhaust gas of the internal combustion engine;
an exhaust heat recovery device that is disposed in an exhaust passage downstream of the exhaust gas temperature variation factor unit in a flow direction of the exhaust gas and that recovers heat from the exhaust gas into a refrigerant that cools the internal combustion engine;
a refrigerant flow rate adjustment unit that adjusts a flow rate of the refrigerant that passes through the exhaust heat recovery device; and
a control unit that controls the refrigerant flow rate adjustment unit,
the exhaust gas temperature variation factor unit including a filter that collects particulate matter included in the exhaust gas,
the control unit being configured to estimate a boiling margin, which is a parameter related to the thermal margin when the refrigerant boils in the exhaust heat recovery device, and prohibits forced regeneration of the filter as a boiling avoidance process, when the boiling margin is less than or equal to a threshold value.

* * * * *